(12) United States Patent
Tsirkin

(10) Patent No.: US 10,423,444 B2
(45) Date of Patent: Sep. 24, 2019

(54) ROUTING TABLE PRESERVATION FOR VIRTUAL MACHINE MIGRATION WITH ASSIGNED DEVICES

(71) Applicant: Red Hat Israel, Ltd., Ra'anana (IL)

(72) Inventor: Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 242 days.

(21) Appl. No.: 15/231,975

(22) Filed: Aug. 9, 2016

(65) Prior Publication Data
US 2018/0046501 A1    Feb. 15, 2018

(51) Int. Cl.
G06F 9/455    (2018.01)
G06F 9/46    (2006.01)
G06F 9/48    (2006.01)

(52) U.S. Cl.
CPC ........ G06F 9/4856 (2013.01); G06F 9/45558 (2013.01); *G06F 2009/4557* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS

| 7,484,208 | B1 * | 1/2009 | Nelson | ................ | G06F 9/45558 711/6 |
|---|---|---|---|---|---|
| 7,788,665 | B2 | 8/2010 | Oshins | | |
| 7,941,539 | B2 | 5/2011 | Tripathi et al. | | |
| 8,429,647 | B2 | 4/2013 | Zhou et al. | | |
| 8,533,713 | B2 * | 9/2013 | Dong | ..................... | G06F 9/4856 718/1 |
| 8,713,139 | B1 | 4/2014 | Kasper et al. | | |
| 8,997,094 | B2 | 3/2015 | Bosch et al. | | |
| 9,141,625 | B1 | 9/2015 | Thornewell et al. | | |
| 2011/0087774 | A1 * | 4/2011 | Pope | ..................... | G06F 9/4856 709/224 |

(Continued)

OTHER PUBLICATIONS

Zhai et al., Live Migration with Pass-through Device for Linux VM, Intel Corp., 2008, Link: http://net.pku.edu.cn/vc/read/VM_OLS08.pdf.

(Continued)

*Primary Examiner* — Bradley A Teets
(74) *Attorney, Agent, or Firm* — K&L Gates LLP

(57) ABSTRACT

A migration system includes a memory, a physical processor, first and second hypervisors, first and second virtual machines, and first and second networking devices. The first hypervisor is located at a migration source location and the second hypervisor is located at a migration destination location. The first virtual machine includes a guest OS which includes a first agent. The second virtual machine includes the guest OS which includes a second agent. The first hypervisor is configured to request the guest OS executing on the first hypervisor to copy a configuration of the first networking device and to store the configuration in a placeholder networking device. The second hypervisor is configured to start the second virtual machine at a destination location, request the guest OS executing on the second virtual machine to copy the configuration from the placeholder networking device and to store the configuration in the second networking device.

20 Claims, 7 Drawing Sheets

(56) References Cited

U.S. PATENT DOCUMENTS

| | | | |
|---|---|---|---|
| 2011/0119670 A1* | 5/2011 | Sugumar | G06F 9/5088 |
| | | | 718/1 |
| 2012/0278804 A1* | 11/2012 | Narayanasamy ... | G06F 9/45558 |
| | | | 718/1 |
| 2013/0046893 A1* | 2/2013 | Hauser | G06F 9/4856 |
| | | | 709/226 |
| 2013/0145368 A1* | 6/2013 | Ofer | G06F 11/008 |
| | | | 718/1 |
| 2013/0254424 A1 | 9/2013 | Guay et al. | |
| 2014/0359613 A1 | 12/2014 | Tsirkin | |
| 2015/0205542 A1* | 7/2015 | Antony | G06F 9/45558 |
| | | | 711/162 |
| 2016/0026489 A1* | 1/2016 | Maislos | G06F 9/45558 |
| | | | 718/1 |
| 2016/0188378 A1* | 6/2016 | Chao | G06F 9/5088 |
| | | | 718/105 |
| 2016/0196158 A1* | 7/2016 | Nipane | G06F 9/45558 |
| | | | 718/1 |
| 2016/0224367 A1* | 8/2016 | Raghu | G06F 9/4856 |
| 2016/0239328 A1* | 8/2016 | Kaplan | G06F 9/45558 |
| 2017/0060628 A1* | 3/2017 | Tarasuk-Levin | G06F 9/4856 |
| 2017/0083424 A1* | 3/2017 | Lenart | G06F 9/4411 |

OTHER PUBLICATIONS

Elatov, Best Practices for Virtual Networking, Technical Support Engineer, GSS, Jun. 2012, Link: https://www.vmware.com/files/pdf/support/landing_pages/Virtual-Support-Day-Best-Practices-Virtual-Networking-June-2012.pdf.

* cited by examiner

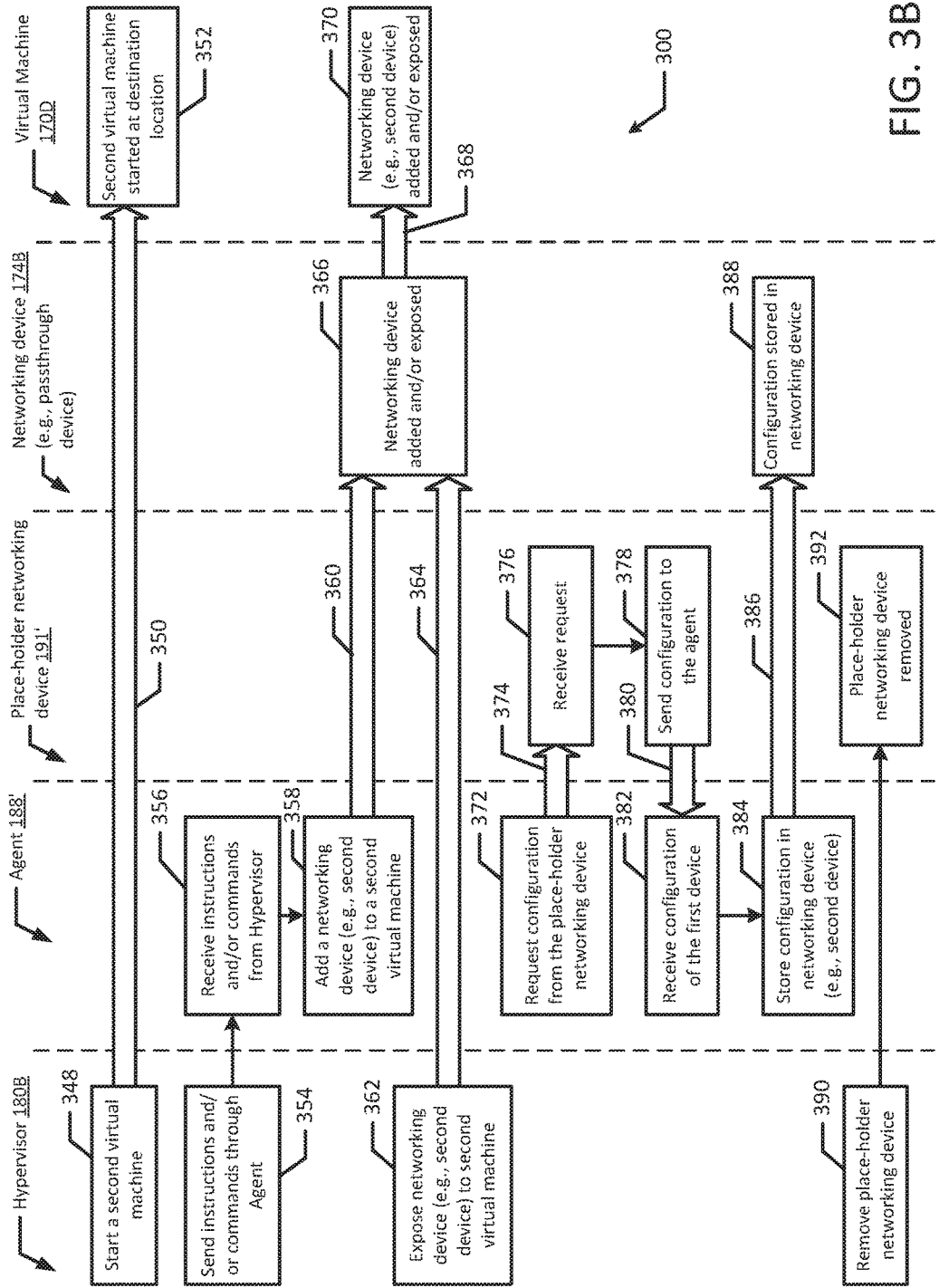

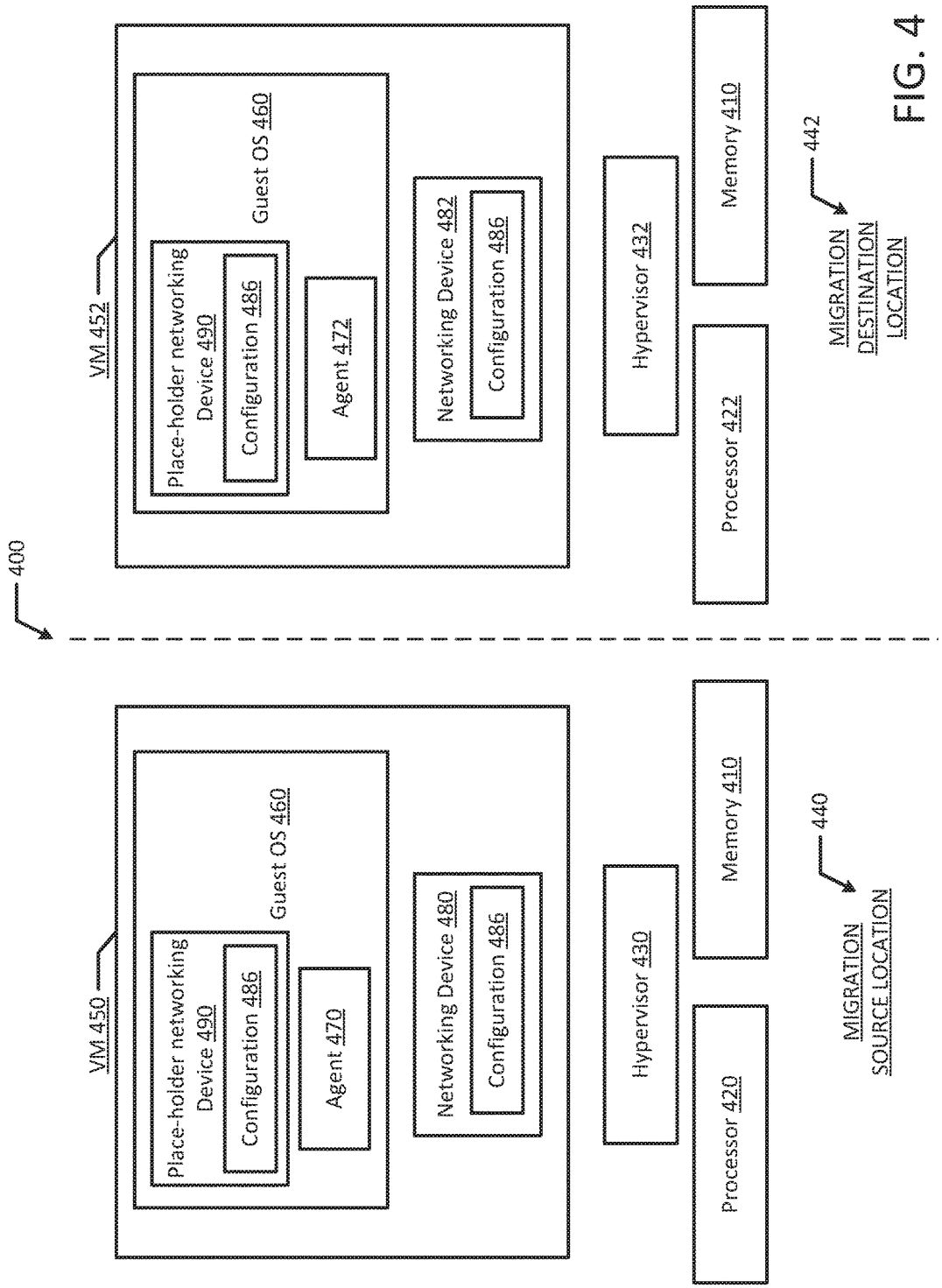

ROUTING TABLE PRESERVATION FOR VIRTUAL MACHINE MIGRATION WITH ASSIGNED DEVICES

BACKGROUND

Computer systems may employ virtual machines including one or more guest operating systems (OS). A virtual machine (VM) is a software implementation of a computer that executes programs in a way similar to a physical machine. The virtual machine may share underlying physical hardware resources between different virtual machines. Each virtual machine may be associated with a physical device, such as a hardware device and/or an assigned device. A virtual machine may include a virtual device that serves as a pass-through device to the physical device, and the virtual machine may perform tasks associated with the functions of the physical device and/or related to the associated physical device. The virtual devices may include configurations, such as network configurations that enable the virtual devices and the physical devices to communicate with the system. Additionally, virtual machines may be stopped and resumed and/or migrated to various physical machines with differing configurations of physical hardware resources.

SUMMARY

The present disclosure provides new and innovative systems and methods of configuration preservation for virtual machine migration with assigned devices. In an example embodiment, a system includes a memory, one or more physical processors in communication with the memory, a first hypervisor executing on the one or more physical processors, a second hypervisor executing on the one or more physical processors, a first virtual machine, and a second virtual machine, a first networking device, and a second networking device. The first hypervisor is located at a migration source location and the second hypervisor is located at a migration destination location. The first virtual machine includes a guest OS executing on the first hypervisor. The guest OS executing on the first hypervisor includes a first agent. The second virtual machine includes the guest OS executing on the second hypervisor. The guest OS executing on the second hypervisor includes a second agent. The first networking device is associated with the first virtual machine, and the second networking device is associated with the second virtual machine. The first hypervisor executes on the one or more physical processors to request the guest OS executing on the first hypervisor to copy a configuration of the first networking device and to store the configuration in a place-holder networking device. The first networking device is part of the first virtual machine. The place-holder networking device is implemented on the guest OS executing on the first hypervisor. The second hypervisor executes on the one or more physical processors to start the second virtual machine at a destination location. Additionally, the second hypervisor executes on the one or more physical processors to request the guest OS executing on the second virtual machine to copy the configuration from the place-holder networking device and to store the configuration in the second networking device.

In an example embodiment, a method includes requesting, by the first hypervisor before migration, a guest OS executing on the first hypervisor to copy a configuration of a first networking device. The first networking device is part of a first virtual machine. The first hypervisor requests the guest OS executing on the first hypervisor to store the configuration in the place-holder networking device before migration. The method further includes starting, by a second hypervisor, a second virtual machine at a destination location. The second hypervisor requests the guest OS executing on the second hypervisor to copy the configuration from the place-holder networking device after migration. The place-holder networking device was migrated from the source location to the destination location. The second hypervisor requests the guest OS executing on the second hypervisor to store the configuration in the second networking device.

In an example embodiment, a non-transitory machine readable medium stores a program, which when executed by a processor, causes a first hypervisor to request, before migration, a guest OS executing on the first hypervisor to save a configuration of a first networking device. The first networking device is part of a first virtual machine. Before migration, the first hypervisor requests the guest OS executing on the second hypervisor to store the configuration to the place-holder networking device.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 3A and 3B illustrate a flow diagram of an example process for virtual machine migration according to an example embodiment of the present disclosure.

FIG. 4 illustrates a block diagram of an example migration system according to an example embodiment of the present disclosure.

DETAILED DESCRIPTION OF EXAMPLE EMBODIMENTS

Techniques are disclosed for providing configuration preservation for virtual machine migration with assigned devices. Assigned devices have varying hardware, firmware, memory sizes, etc. Current techniques for live migration with an assigned device typically involve removing any assigned devices (e.g., networking device) from a virtual machine before the virtual machine is migrated. However, these techniques are generally expensive and result in additional downtime. For example, when an assigned device (e.g., networking device) is removed from a virtual machine, networking configurations may be lost, which may cause significant network downtime. To reduce downtime, downtime bonding and/or teaming may be used, however, these techniques introduce over head on the data path and are not supported for all guest OSes. Additionally, when bonding and/or teaming is implemented, the system may be difficult to debug, which may result in a misconfigured system resulting in poor performance.

As discussed in the various example embodiments disclosed herein, to decrease downtime and increase efficiency of migrating virtual machines with assigned devices (e.g., networking device) from a migration source to a migration destination, a place-holder networking device may be used to store the networking configuration to prevent the networking configuration such as an IP address, routing table, neighbor table, etc. from being lost when the assigned device is removed before the virtual machine is migrated. This advantageously allows for efficient migration and prevents significant network downtime that may result in reestablishing networking configurations after the virtual machine migrates. For example, reestablishing the configuration for an assigned device may result in wasted resources. However, loading the stored configuration from a place-holder networking device to the assigned device at the migration destination location may enable the system to utilize the network before experiencing unwanted network downtime. Thus, the techniques described herein advantageously enables migration for virtual machines with assigned devices while avoiding losing the configuration of the assigned device after it is removed from the virtual machine before migration.

Figure 1A:
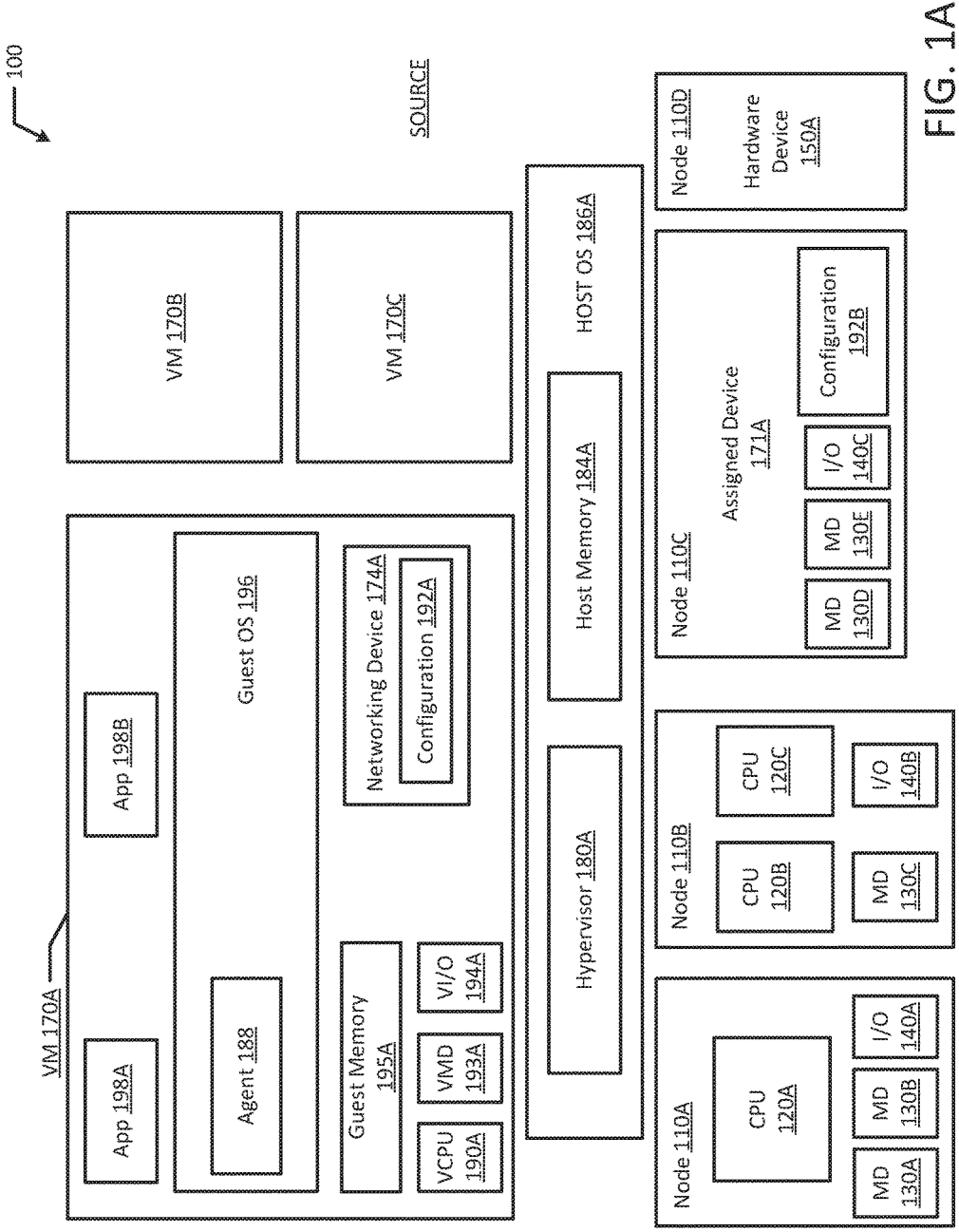
FIG. 1A illustrates a block diagram of an example migration system at a migration source according to an example embodiment of the present disclosure.
Figure 1B:
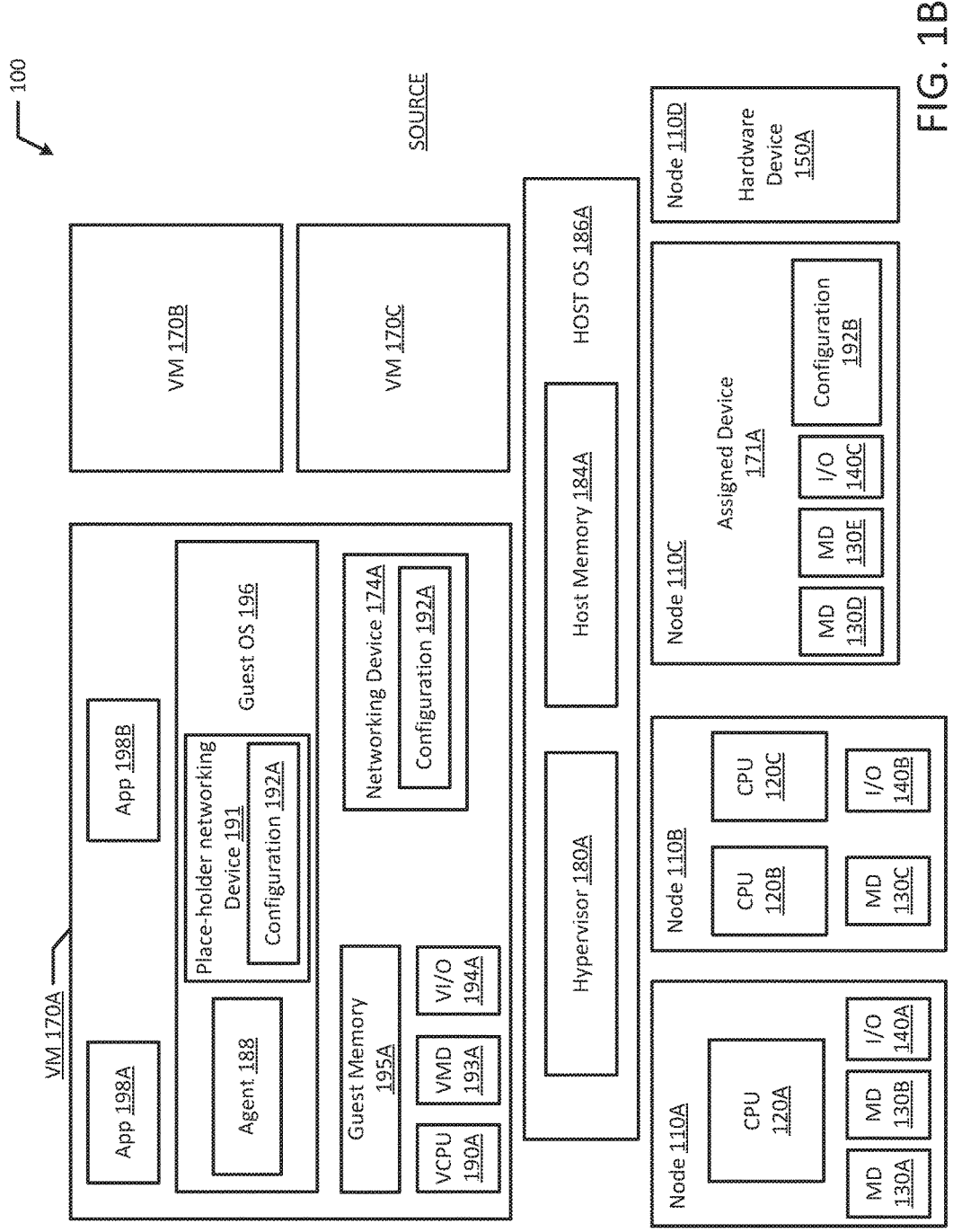
FIG. 1B illustrates a block diagram of an example migration system at a migration source according to an example embodiment of the present disclosure.

FIGS. 1A and 1B depict a high-level component diagram of an example migration system 100 at a migration source location in accordance with one or more aspects of the present disclosure. The migration system 100 may include a memory (e.g., MD 130A-E), one or more physical processors in communication with the memory (e.g., CPU 120A-C), one or more virtual machines (e.g., VM 170A-C), and a hypervisor (e.g., hypervisor 180A).

The virtual machines 170A-C may include a guest OS, guest memory, a virtual CPU (VCPU), virtual memory devices (VMD), and virtual input/output devices (VI/O). For example, virtual machine 170A may include Guest OS 196, guest memory 195A, a virtual CPU 190A, a virtual memory device 193A, and virtual input/output device 194A. In an example, a first virtual machine (e.g., VM 170A) may include a first networking device 174A. For example, the first networking device 174A may be a pass-through device that is virtualized or emulated by the hypervisor 180A. The first networking device 174A may be associated with an assigned device 171A. The first networking device 174A may include a configuration 192A. Guest memory (e.g., Guest Memory 195A) may include one or more memory pages. Additionally, the first virtual machine 170A may include an agent 188. The agent may run within guest OS 196. As illustrated in FIG. 1B, the migration system 100 may include a place-holder networking device 191. The place-holder networking device 191 may be added to the first virtual machine 170A at any time. For example, the place-holder networking device 191 may be added shortly before migration. The place-holder networking device 191 may include a configuration, such as configuration 192A, which may be copied from the first networking device 174A. Additionally, the place-holder networking device 191 may be a software device such as a tap device.

As noted above, migration system 100 may run multiple virtual machines (e.g., VM 170A-C), by executing a software layer (e.g., hypervisor 180A) above the hardware and below the virtual machines 170A-C, as schematically shown in FIGS. 1A and 1B. In an example, the hypervisor 180A may be a component of the host operating system 186A executed by the migration system 100. In another example, the hypervisor 180A may be provided by an application running on the operating system 186A, or may run directly on the migration system 100 without an operating system beneath it. The hypervisor 180A may virtualize the physical layer, including processors, memory, and I/O devices, and present this virtualization to virtual machines 170A-C as devices, including virtual processors (e.g., VCPU 190A), virtual memory devices (e.g., VMD 193A), and/or virtual I/O devices (e.g., VI/O 194A). Also, similar to illustrated VM 170A, each of VM 170B and/or VM 170C may include one or more VCPUs, VMDs, and/or VI/O devices.

In an example, a virtual machine 170A may execute a guest operating system 196 which may utilize the underlying VCPU 190A, VMD 193A, and VI/O device 194A. One or more applications 198A-B may be running on a virtual machine 170A under the respective guest operating system 196. A virtual machine (e.g., VM 170A-F, as illustrated in FIGS. 1A and 1B) may run on any type of dependent, independent, compatible, and/or incompatible applications on the underlying hardware and OS (e.g., host OS 186A-B). In an example, applications (e.g., App 198A-B) run on a virtual machine 170A may be dependent on the underlying hardware and/or OS 186A. In another example, applications 198A-B run on a virtual machine 170A may be independent of the underlying hardware and/or OS 186. For example, applications 198A-B run on a first virtual machine 170A may be dependent on the underlying hardware and/or OS 186 while applications run on a second virtual machine (e.g., VM 170B) are independent of the underlying hardware and/or OS 186A. Additionally, applications 198A-B run on a virtual machine 170A may be compatible with the underlying hardware and/or OS 186A. In an example, applications 198A-B run on a virtual machine 170A may be incompatible with the underlying hardware and/or OS 186A. For example, applications 198A-B run on one virtual machine 170A may be compatible with the underlying hardware and/or OS 186A while applications run on another virtual machine 170B are incompatible with the underlying hardware and/or OS 186A. In an example, a device may be implemented as a virtual machine (e.g., virtual machine 170A-F).

The hypervisor 180A may manage host memory 184A for the host operating system 186A as well as memory allocated to the virtual machines 170A-B and guest operating systems 196 such as guest memory 195A provided to guest OS 196. Host memory 184A and guest memory 195A may be divided into a plurality of memory pages that are managed by the hypervisor 180A. Guest memory 195A allocated to the guest OS 196 may be mapped from host memory 184A such that when a guest application 198A-B uses or accesses a memory page of guest memory 195A it is actually using or accessing host memory 184A.

The migration system 100, at the migration source location, may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Nodes 110C-D may include a device such as an assigned device 171A or a hardware device 150A. In an example, a hardware device (e.g., 150A) and/or an assigned device 171A may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. The Nodes 110C-D may include one ore more physical processors communicatively coupled to memory devices (e.g., MD 130D-E) and input/output devices (e.g., I/O 140C). Additionally, Node 110C may be an assigned device 171A with a configuration 192B. For example, configurations 192A-B may both be associated with the first networking device 174A because the first networking device 174A may serve as a pass-through device that may be associated with assigned device 171A.

Figure 1C:
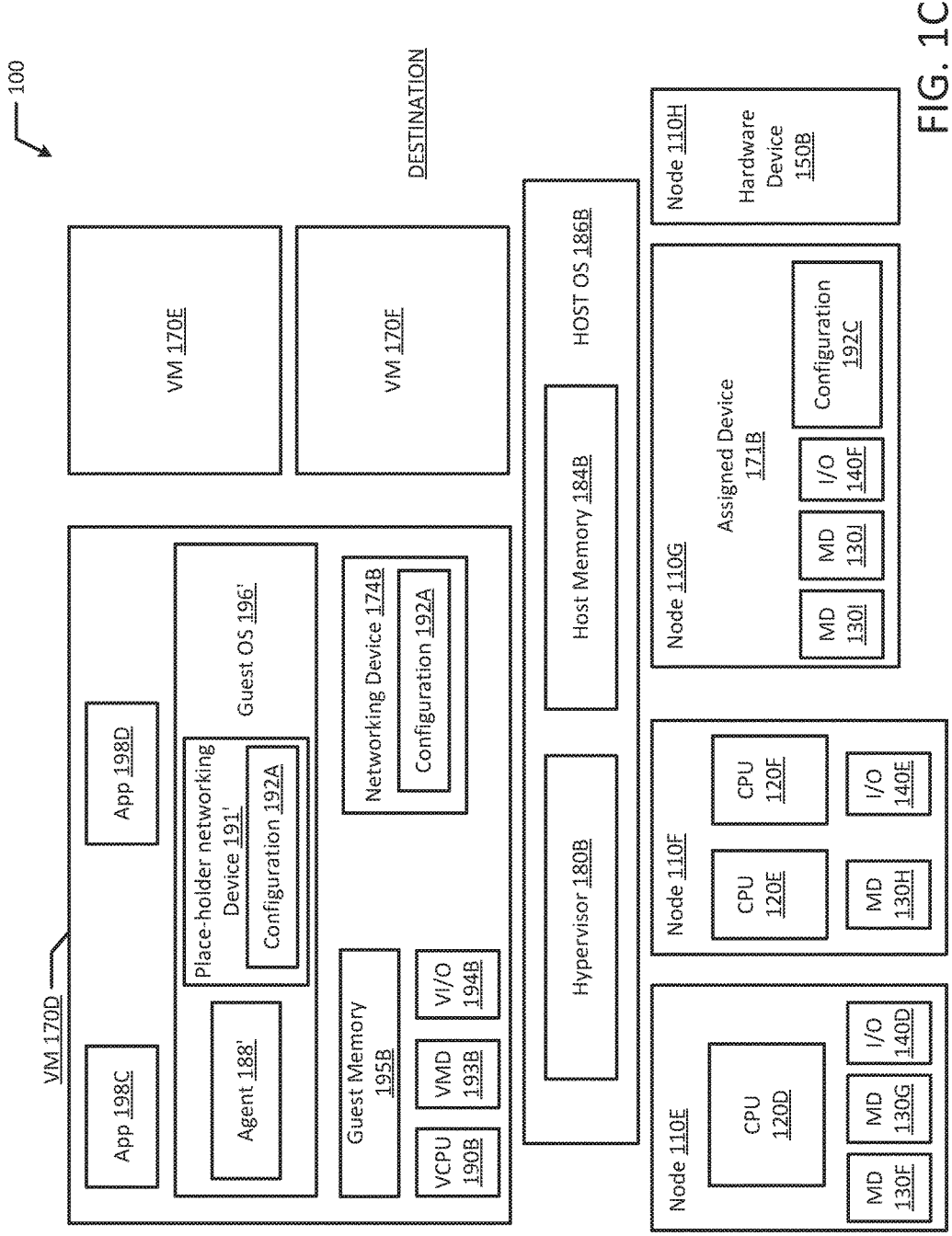
FIG. 1C illustrates a block diagram of an example migration system at a migration destination according to an example embodiment of the present disclosure.

FIG. 1C depicts a high-level component diagram of the example migration system 100 at a migration destination location in accordance with one or more aspects of the present disclosure. The migration system 100 may include a memory (e.g., MD 130F-H), one or more physical processors in communication with the memory (e.g., CPU 120D-F), one or more virtual machines (e.g., VM 170D-F), and a hypervisor (e.g., hypervisor 180B).

The virtual machines 170D-F may include a guest OS, guest memory, a virtual CPU (VCPU), virtual memory devices (VMD), and virtual input/output devices (VI/O). For example, virtual machine 170D may include Guest OS 196' (e.g., the migrated Guest OS 196), guest memory 195B, a virtual CPU 190B, a virtual memory device 193B, and virtual input/output device 194B. In an example, a second virtual machine (e.g., VM 170D) may include a second networking device 174B. For example, the second networking device 174B may be a pass-through device that is virtualized or emulated by the second hypervisor 180B. The second networking device 174B may be associated with assigned device 171B. The second networking device 174B may include a configuration 192A. Guest memory (e.g., Guest Memory 195B) may include one or more memory pages. Additionally, the second virtual machine 170D may include an agent 188'. The agent 188' may run within guest OS 196'. The migration system 100 may include a placeholder networking device 191'. The place-holder networking device 191' may include a configuration, such as configuration 192A, which may be copied to the second networking device 174B. Additionally, the place-holder networking device 191' may be a software device such as a tap device.

As noted above, migration system 100 may run multiple virtual machines (e.g., VM 170D-F), by executing a software layer (e.g., hypervisor 180B) above the hardware and below the virtual machines 170D-F, as schematically shown in FIG. 1C. In an example, the hypervisor 180B may be a component of the host operating system 186B executed by the migration system 100. In another example, the hypervisor 180B may be provided by an application running on the operating system 186B, or may run directly on the migration system 100 without an operating system beneath it. The hypervisor 180B may virtualize the physical layer, including processors, memory, and I/O devices, and present this virtualization to virtual machines 170D-F as devices, including virtual processors (e.g., VCPU 190B), virtual memory devices (e.g., VMD 193B), and/or virtual I/O devices (e.g., VI/O 194B). It should be appreciated that VM 170E and VM 170F may include one or more VCPUs, VMDs, and/or VI/O devices.

In an example, a virtual machine 170D may execute a guest operating system 196' which may utilize the underlying VCPU 190B, VMD 193B, and VI/O device 194B. One or more applications 198C-D may be running on a virtual machine 170D under the respective guest operating system 196'. The hypervisor 180B may manage host memory 184B for the host operating system 186B as well as memory allocated to the virtual machines 170D-F and guest operating systems 196' such as guest memory 195B provided to guest OS 196'. Host memory 184B and guest memory 195B may be divided into a plurality of memory pages that are managed by the hypervisor 180B. Guest memory 195B allocated to the guest OS 196' may be mapped from host memory 184B such that when a guest application 198C-D uses or accesses a memory page of guest memory 195B it is actually using or accessing host memory 184B.

The migration system 100, at the migration destination location, may include one or more interconnected nodes 110E-H. Each node 110E-F may in turn include one or more physical processors (e.g., CPU 120D-F) communicatively coupled to memory devices (e.g., MD 130F-H) and input/output devices (e.g., I/O 140D-E). Nodes 110G-H may include a device such as an assigned device 171B or a hardware device 150B. In an example, a hardware device (e.g., 150B) and/or an assigned device 171B may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. The Nodes 110G-H may include one ore more physical processors communicatively coupled to memory devices (e.g., MD 1301-J) and input/output devices (e.g., I/O 140F). Additionally, Node 110G may be an assigned device 171B with a configuration 192C. For example, configurations 192A-C may both be associated with the second networking device 174B because the second networking device 174B may serve as a pass-through device that may be associated with assigned device 171B.

As used herein, a physical processor or a processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-H refers to a volatile or non-volatile memory device, such as RAM, ROM, EEPROM, or any other device capable of storing data. As discussed herein, I/O device 140A-E refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node and/or between nodes, including the connections between a processor 120A-F and a memory device 130A-J and between a processor 120A-F and an I/O device 140A-F, may be provided by one or more local buses of suitable architecture, for example, peripheral component interconnect (PCI).

Figure 2:
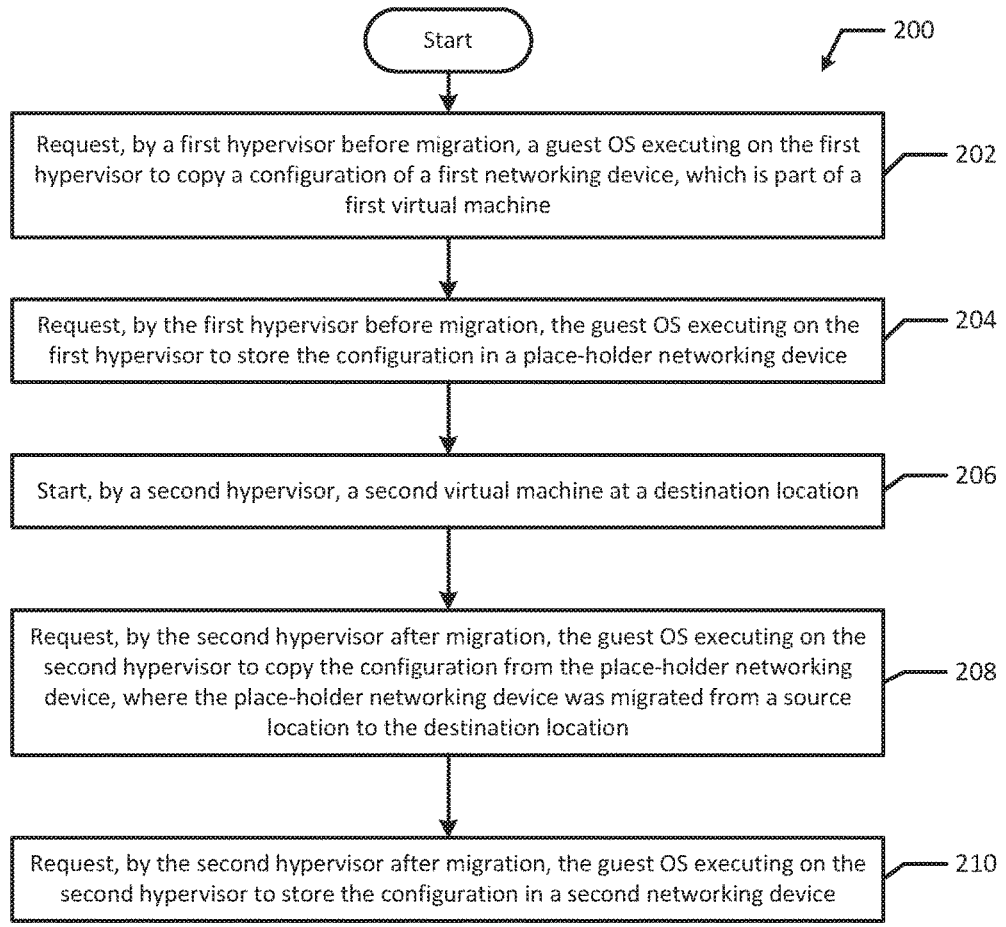
FIG. 2 illustrates a flowchart of an example process for virtual machine migration according to an example embodiment of the present disclosure.

FIG. 2 illustrates a flowchart of an example method 200 for virtual machine migration in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may include hardware (circuitry, dedicated logic, etc.), software, or a combination of both.

The example method 200 includes requesting a guest OS executing on a first hypervisor to copy a configuration of a first networking device before migration (block 202). For example, a first hypervisor 180A may request a guest OS 196 executing on the first hypervisor 180A to copy a configuration 192A of a first networking device 174A before migration. The configuration 192A may be the same as configuration 192B or may be similar to configuration 192B. For example, the first networking device 174A may serve as a pass-through device that may be associated with assigned device 171A and the configuration 192B may be the same as the configuration 192A. In an example, a first hypervisor 180A may request an agent 188 running within the guest OS 196 executing on the first hypervisor 180A to copy a configuration 192A of a first networking device 174A before migration. Then, example method 200 includes requesting the guest OS executing on the first hypervisor to store the configuration in a place-holder networking device (block 204). In an example, the first networking device 174A is part of a first virtual machine 170A. For example, the first hypervisor 180A may request the guest OS 196 executing on the first hypervisor 180A to store the configuration 192A in a place-holder networking device 191 before migration. For example, the configuration 192A may be stored the place-holder networking device 191 such that the first networking device 174A has the same configuration 192A as the place-holder networking device 191. In an example, the first hypervisor 180A may request an agent 188 running within the guest OS 196 executing on the first hypervisor 180A to store the configuration 192A in a place-holder networking device 191 before migration. Additionally, the first hypervisor 180A may remove the first networking device 174A from the first virtual machine 170A. In an example, the first hypervisor 180A may remove the association between the first networking device 174A and the assigned device 171A. Then, the first hypervisor 180A may stop the first virtual machine 180A at the migration source location.

Then, a second virtual machine may be started at a destination location (block 206). For example, a second hypervisor 180B starts a second virtual machine 170D at a destination location. In an example, the second virtual machine 170D may be the same as the first virtual machine 170A. For example, the second virtual machine 170D may be the first virtual machine 170A migrated from the migration source location to the migration destination location. After migration, example method 200 includes requesting the guest OS executing on a second hypervisor to copy the configuration from the place-holder networking device (block 208). In an example, the place-holder networking device 191 may be migrated from a source location to a destination location. For example, the second hypervisor 180B may request the guest OS 196' executing on the second hypervisor 180B to copy the configuration 192A from the place-holder networking device 191' after migration. In an example, the second hypervisor 180B may request the agent 188' running within guest OS 196' executing on the second hypervisor 180B to copy the configuration 192A from the place-holder networking device 191' after migration. Then, example method 200 includes requesting the guest OS executing on the second hypervisor to store the configuration in a second networking device (block 210). The configuration 192A may be stored in the second networking device 174B such that the second networking device 174B has the same configuration as the first networking device 174A. The configuration may be retained during migration, which advantageously reduces network downtime and overhead involved in reestablishing network connectivity after migration. For example, the second hypervisor 180B may request the guest OS 196' executing on the second hypervisor 180B to store the configuration in a second networking device 174B. In an example, the second hypervisor 180B may request the agent 188' running within guest OS 196' executing on the second hypervisor 180B to store the configuration in a second networking device 174B.

Figure 3A:
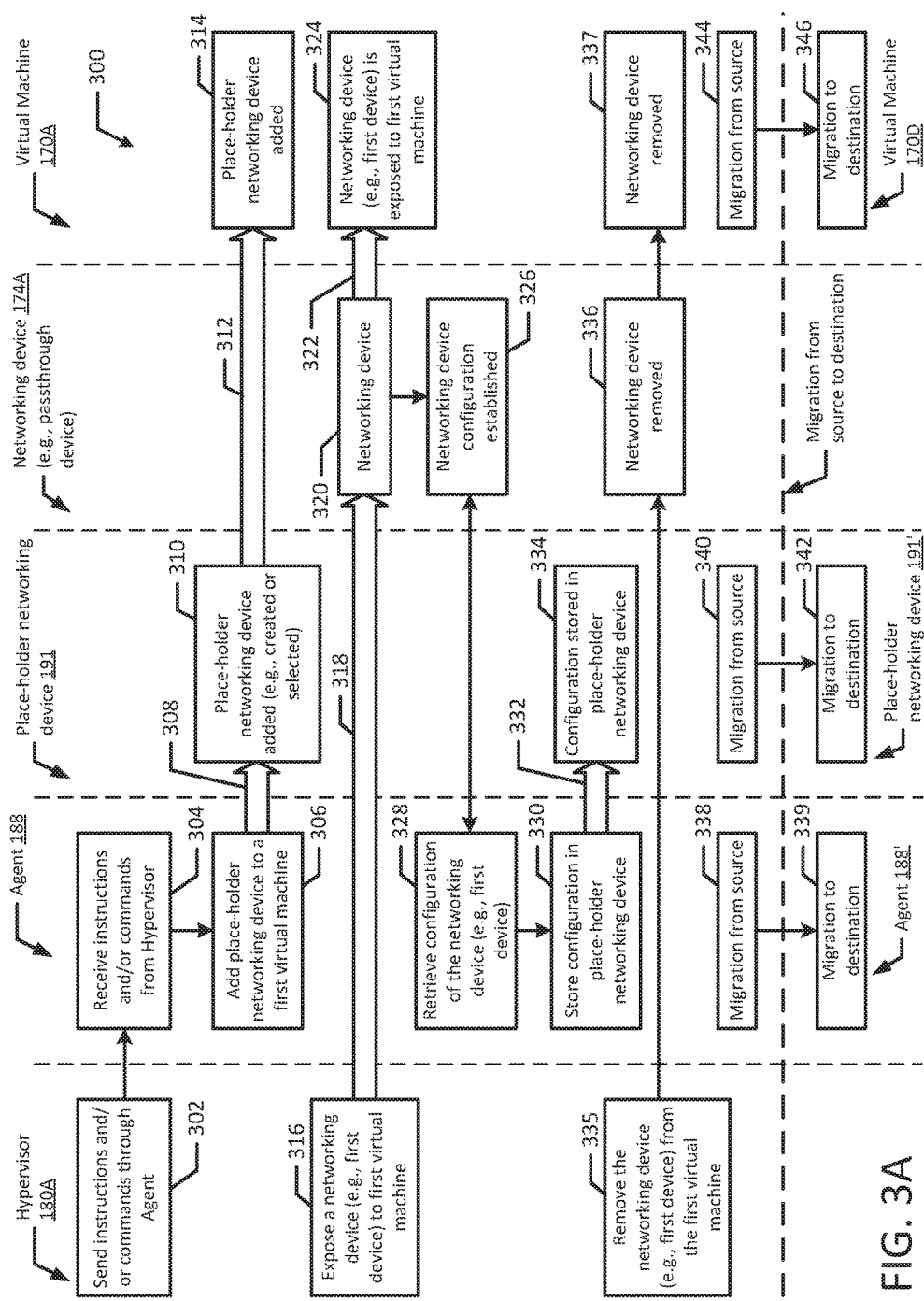

FIGS. 3A and 3B depict a flow diagram illustrating an example method 300 for virtual machine migration according to an example embodiment of the present disclosure. Although the example method 300 is described with reference to the flow diagram illustrated in FIGS. 3A and 3B, it will be appreciated that many other methods of performing the acts associated with the method may be used. For example, the order of some of the blocks may be changed, certain blocks may be combined with other blocks, and some of the blocks described are optional. The method may be performed by processing logic that may include (e.g., circuitry, dedicated logic, etc.), software, or a combination of both.

In the illustrated example, a first hypervisor 180A may send instructions and/or commands through an agent 188 (block 302). For example, a first hypervisor 180A may request a guest OS 196 to execute a command (e.g., copy a configuration) by sending instructions and/or commands through an agent 188 running within the guest OS 196. The agent 188 may receive instructions and/or commands from the first hypervisor 180 (block 304). For example, the agent may receive instructions and/or commands directly from the first hypervisor 180A. Additionally, the agent 188 may receive instructions from the guest OS 196. For example, the first hypervisor 180A may send instructions to the guest OS 196, which may pass the instructions to the agent 188.

Then, the agent 188 may add a place-holder networking device 191 to a first virtual machine 170A (blocks 306 and 308). In an example, the first hypervisor 180A may add the place-holder networking device 191 to the first virtual machine 170A. Additionally, the guest OS 196 executing on the first hypervisor 180A may add the place-holder networking device 191 to the first virtual machine 170A. The place-holder networking device 191 is added to the first virtual machine 170A (blocks 310 to 314). In an example, the place-holder networking device 191 may be created. For example, the first hypervisor 180A, the guest OS 196 and/or the agent 188 may create the place-holder networking device 191 and add the place-holder networking device 191 to the first virtual machine 170A. In another example, the place-holder networking device 191 may be selected. For example, a plurality of place-holder networking devices may be pre-created and the place-holder networking device 191 may be selected to use for the migration. The hypervisor 180A or the agent 188 may select a pre-created place-holder networking device 191 to add to the first virtual machine 170A.

A networking device 174A may be exposed to the virtual machine 170A (blocks 316 to 324). In an example, the networking device 174A may be exposed to the first virtual machine 170A before the place-holder networking device is added. In another example, the networking device 174A may be exposed to the virtual machine 170A after the place-holder networking device is added. The networking device 174A may have an associated configuration 192A (block 326). For example, the configuration 192A may include a MAC address, an IP address, a routing table, a neighbor table, etc. The agent 188 may retrieve the configuration 192A of the networking device 174A (block 328). For example, the first hypervisor 180A may request the guest OS 196 executing on the first hypervisor 180A to copy the configuration 192A of the networking device 174A. In an example, the hypervisor 180A may send the request to the agent 188 and/or the guest OS 196. Additionally, retrieving the configuration 192A may include the agent 188 requesting the configuration from the first networking device 174A, which may receive the request and send the configuration 192A to the agent 188.

Then, the agent 188 may store the configuration in the place-holder networking device 191 (blocks 330 and 332). The configuration 192A may be stored in the place-holder networking device 191 such that the first networking device 174A has the same configuration 192A as the place-holder networking device 191, which advantageously prevents the configuration 192A from being lost during migration when the first networking device 174A is removed from the first virtual machine 170A. In an example, the first hypervisor 180A may request the guest OS 196 executing on the first hypervisor to store the configuration 192A in the place-holder networking device 191. For example, the hypervisor 180A may send the request to the agent 188 and/or the guest OS 196. Moreover, in the illustrated example, the configuration 192A is stored in the place-holder networking device 191 (block 334). In an example, the configuration 192A may include a MAC address, an IP address, a routing table, a neighbor table, etc. In an example, the configuration may be stored in the place-holder networking device 191 by updating and/or programming a routing table. For example, when the routing table is programmed and/or updated, the original routing table may not work anymore. In an example, programming the routing table may be given a lower priority to reduce network downtime, as network downtime may start as soon as the configuration 192A is stored in the place-holder networking device 191 since the place-holder networking device 191 may not be connected to other system components. Then, the first hypervisor 180A may remove the networking device 174A from the first virtual machine 170A (blocks 335 to 337). In an example, the agent 188 and/or the guest OS 196 may remove the networking device 174A from the first virtual machine 170A.

Then, guest OS 196 and/or the virtual machine 170A may migrate from the source to the destination, thus the agent 188 and/or the place-holder networking device running within the guest OS 196 may migrate along with the guest OS 196 (blocks 338 to 346). For example, the guest OS 196 may migrate from the source to the destination (represented as guest OS 196' at the migration destination). In an example, the agent 188 and/or the place-holder networking device 191 may migrate separately. For example, the agent 188 may migrate from the source to the destination (blocks 338 and 339). Similarly, the place-holder networking device 191 may migrate from the source to the destination (blocks 340 and 342). In an example, the place-holder networking device 191 may migrate with the guest OS 196 and/or first virtual machine 170A. The virtual machine 170A may also migrate from the source to the destination (blocks 344 and 346). In an example, the second virtual machine 170D may be the first virtual machine 170A migrated from the migration source. Additionally, the second virtual machine 170D may be added at the migration source by the second hypervisor 180B. In an example, some of the components of the first virtual machine 170A (e.g., agent 188, guest OS 196, place-holder networking device 191) may migrate from the source to the destination. In another example, the first virtual machine 170A and all of its contents may migrate from the source to the destination.

A hypervisor 180B (e.g., hypervisor at the migration destination) may start a virtual machine 170D (blocks 348 and 350). For example, the first virtual machine 170A may migrate to the migration destination (represented as virtual machine 170D) when the second hypervisor 180B starts the second virtual machine 170D (e.g., migrated virtual machine) at the migration destination. In an example, the contents of the first virtual machine 170A may be copied over to the second virtual machine 170D and the second virtual machine 170D may be started at the destination. The virtual machine 170D may be started at the destination location (block 352). In an example, the virtual machine 170D may be identical to virtual machine 170A. In another example, the virtual machine 170D may be similar to virtual machine 170A.

The hypervisor 180B may send instructions and/or commands through the migrated agent 188' (block 354). For example, a second hypervisor 180B may request a guest OS 196' to execute a command (e.g., copy a configuration) by sending instructions and/or commands through the agent 188' running within the guest OS 196'. The migrated agent 188' may receive instructions and/or commands from the hypervisor 180B (block 356). For example, the migrated agent 188' may receive instructions and/or commands directly from the second hypervisor 180B. Additionally, the agent 188' may receive instructions from the guest OS 196'. For example, the second hypervisor 180B may send instructions to the guest OS 196', which may pass the instructions to the agent 188'.

Then, the agent 188' may add a second networking device 174B to virtual machine 170D (blocks 358 and 360). In an example, the second hypervisor 180B may add the second networking device 174B to the second virtual machine 170D. Additionally, the guest OS 196' executing on the second hypervisor 180B may add the second networking device 174B to the second virtual machine 170D. The hypervisor 180B may also expose the second networking device 174B to the second virtual machine 170D (blocks 362 and 364). In an example, the second networking device 174B may be exposed to the second virtual machine 170D before the place-holder networking device 191 migrates. In another example, the second networking device 174B may be exposed to the second virtual machine 170D after the place-holder networking device 191' has migrated. Then, the second networking device 174B may be added and/or exposed to the virtual machine 170D (blocks 366 to 370).

Then, the agent 188' may request the configuration 192A from the place-holder networking device 191' (blocks 372 and 374). For example, the second hypervisor 180B may request the that the guest OS 196' copy the configuration 192A from the place-holder networking device 191', and the guest OS 196' may send the request via the agent 188'. Then, responsive to the agent 188' requesting the configuration 192A, the place-holder networking device 191' may receive the request (block 376). In an example, the place-holder networking device 191' may receive the request from the guest OS 196'. Then, the place-holder networking device 191' may send the configuration 192A to the agent 188' (blocks 378 and 380). For example, the configuration 192A may be the same as 192C, such that the configuration 192A is associated with the networking configuration for both the second networking device 174B and the associated assigned device 171B can be established at the migration destination through the configuration 192A. The agent 188' may receive the configuration 192A of the place-holder networking device 191' (block 382). In an example, agent 188' may retrieve the configuration 192A similar to block 328 discussed above. For example, the second hypervisor 180B may request the guest OS 196' executing on the second hypervisor 180B to copy the configuration 192A of the place-holder networking device 191'. In an example, the second hypervisor 180B may send the request to the agent 188' and/or the guest OS 196'.

Then, the agent 188' may store the configuration 192A in the second networking device 174B (blocks 384 and 386). The configuration 192A may be stored in the second networking device 174B such that the second networking device 174B has the same configuration 192A as the first networking device 174A. For example, that the configuration 192A may be retained during migration, which advantageously reduces network downtime and system overhead involved in reestablishing network connectivity. In an example, the second hypervisor 180B may request the guest OS 196' executing on the second hypervisor 180B to store the configuration 192A in the second networking device 174B. For example, the second hypervisor 180B may send the request to the agent 188' and/or the guest OS 196'. The configuration 192A may be stored in the second networking device 174B (block 388). In an example, the configuration 192A and/or 192C may include a MAC address, an IP address, a routing table, a neighbor table, etc. Then, the second hypervisor 180B may remove the place-holder networking device 191' (blocks 390 and 392). For example, the second hypervisor 180B may remove the place-holder networking device 191' from the second virtual machine 170D. In another example, the place-holder networking device 191' may remain with the second virtual machine 170D to be used with a future migration to a second destination location. For example, removing the place-holder networking device 191' may be given a low priority such that it is retained for a period of time to be used for higher priority instructions which may include a second migration.

FIG. 4 is a block diagram of an example migration system 400 according to an example embodiment of the present disclosure. The migration system 400 may include a memory 410 and one or more physical processors (e.g., processor 420 and processor 422) in communication with the memory 410. The migration system 400 may include a first hypervisor 430 executing on the one or more physical processors (e.g., processor 420). The first hypervisor 430 may be located at a migration source location 440. The migration system 400 may further include a second hypervisor 432 executing on the one or more physical processors (e.g., processor 422). The second hypervisor 432 may be located at a migration destination location 442. The migration system 400 may include a first virtual machine 450. The first virtual machine 450 may include a guest OS 460 executing on the first hypervisor 430. The guest OS 460 executing on the first hypervisor 430 may include a first agent 470. The migration system 400 may further include a second virtual machine 452. The second virtual machine 452 may include the guest OS 460 executing on the second hypervisor 432. The guest OS 460 executing on the second hypervisor 432 may include a second agent 472. The migration system 400 may include a first networking device 480. The first networking device 480 may be associated with the first virtual machine 450. The migration system 400 may further include a second networking device 482. The second networking device 482 may be associated with the second virtual machine 452. The first hypervisor 430 may execute on the one or more physical processors (e.g., processor 420) to request the guest OS 460 executing on the first hypervisor 430 to copy a configuration 486 of the first networking device 480, and request the guest OS 460 executing on the first hypervisor 430 to store the configuration 486 in a place-holder networking device 490. The place-holder networking device 490 may be implemented on the guest OS 460 executing on the first hypervisor 430. The second hypervisor 432 may execute on the one or more physical processors (e.g., processor 422) to start the second virtual machine 452 at the migration destination location 442, request the guest OS 460 executing on the second virtual machine 452 to copy the configuration 486 from the place-holder networking device 490, and request the guest OS 460 executing on the second virtual machine 452 to store the configuration 486 in the second networking device 482.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   a first physical processor and a second physical processor, in communication with the memory;
   a first hypervisor executing on the first physical processor, wherein the first hypervisor is located at a migration source location;
   a second hypervisor executing on the second physical processor, wherein the second hypervisor is located at a migration destination location;
   a first virtual machine including, before migration, a guest OS executing on the first hypervisor, wherein the guest OS executing on the first hypervisor includes a first agent;
   a second virtual machine including, after migration, the guest OS executing on the second hypervisor, wherein the guest OS executing on the second hypervisor includes a second agent;
   a first networking device, wherein the first networking device is associated with the first virtual machine; and
   a second networking device, wherein the second networking device is associated with the second virtual machine, wherein the first hypervisor executes on the first physical processor to:
    request the guest OS executing on the first hypervisor to copy a configuration of the first networking device connected to a network, and
    request the guest OS executing on the first hypervisor to store the configuration in a place-holder networking device while the first networking device maintains connectivity with the network, wherein the place-holder networking device is implemented on the guest OS executing on the first hypervisor,
wherein the second hypervisor executes on the second physical processor to:
    start the second virtual machine at a destination location,
    request the guest OS executing on the second virtual machine to copy the configuration from the place-holder networking device, and
    request the guest OS executing on the second virtual machine to store the configuration in the second networking device to re-establish connectivity with the network.

2. The system of claim 1, wherein one of the first hypervisor, the guest OS executing on the first hypervisor, and the first agent running within the guest OS executing on the first hypervisor adds the place-holder networking device to the first virtual machine.

3. The system of claim 1, wherein one of the second hypervisor, the guest OS executing on the second hypervisor, and the second agent running with the guest OS executing on the second hypervisor adds the second networking device to the second virtual machine.

4. The system of claim 1, wherein the configuration includes at least one of a MAC address, an IP address, a routing table, and a neighbor table.

5. The system of claim 1, wherein the first hypervisor removes the first networking device from the first virtual machine.

6. The system of claim 1, wherein there is an association between the first networking device and a first assigned device, and the first assigned device is a hardware device.

7. A method comprising:
    requesting, by a first hypervisor before migration, a guest OS executing on the first hypervisor to copy a configuration of a first networking device connected to a network, wherein the first networking device is part of a first virtual machine;
    requesting, by the first hypervisor before migration, the guest OS executing on the first hypervisor to store the configuration in a place-holder networking device while the first networking device maintains connectivity with the network;
    starting, by a second hypervisor, a second virtual machine at a destination location;
    requesting, by the second hypervisor after migration, the guest OS executing on the second hypervisor to copy the configuration from the place-holder networking device, wherein the place-holder networking device was migrated from a source location to the destination location; and
    requesting, by the second hypervisor after migration, the guest OS executing on the second hypervisor to store the configuration in a second networking device to re-establish connectivity with the network.

8. The method of claim 7, further comprising adding, by the second hypervisor, the second networking device to the second virtual machine.

9. The method of claim 7, wherein the first hypervisor executes commands through a first agent running within the guest OS executing on the first hypervisor, and the second hypervisor executes commands through a second agent running within the guest OS executing on the second hypervisor.

10. The method of claim 7, further comprising removing, by the second hypervisor, the place-holder networking device from the second virtual machine.

11. The method of claim 7, further comprising adding, by the first hypervisor, the place-holder networking device to the first virtual machine, wherein the place-holder networking device is implemented on the guest OS executing on the first hypervisor.

12. The method of claim 11, wherein adding the place-holder networking device includes creating, by the first hypervisor, the place-holder networking device.

13. The method of claim 11, wherein adding the place-holder networking device includes selecting the place-holder networking device from a plurality of pre-created place-holder networking devices.

14. The method of claim 11, wherein the second hypervisor utilizes the place-holder networking device for a migration to a second destination location.

15. The method of claim 7, wherein storing the configuration on the place-holder networking device includes programming a routing table, wherein programming the routing table causes networking downtime.

16. The method of claim 15, wherein the task of programming the routing table is given a lower priority than adding the second networking device to the second virtual machine.

17. The method of claim 7, further comprising:
    removing, by the first hypervisor, an association between the first networking device and a first assigned device; and
    stopping, by the first hypervisor, the first virtual machine at the source location.

18. The method of claim 7, further comprising removing, by the second hypervisor, the place-holder networking device from the second virtual machine at the destination location.

19. A non-transitory machine readable medium storing a program, which when executed by a processor, causes a first hypervisor and a second hypervisor to:
    request, by the first hypervisor before migration, a guest OS executing on the first hypervisor to save a configuration of a first networking device connected to a network, wherein the first networking device is part of a first virtual machine at a source location;
    request, by the first hypervisor before migration, the guest OS executing on the first hypervisor to store the configuration to a place-holder networking device while the first networking device maintains connectivity with the network;
    start, by the second hypervisor, a second virtual machine at a destination location;
    request, by the second hypervisor after migration, the guest OS executing on the second hypervisor to copy the configuration from the place-holder networking device, wherein the place-holder networking device was migrated from the source location to the destination location; and
    request, by the second hypervisor after migration, the guest OS executing on the second hypervisor to store the configuration to a second networking device to re-establish connectivity with the network.

20. The non-transitory machine of claim 19, wherein the first hypervisor is further caused to:
- add the place-holder networking device to the first virtual machine, wherein the place-holder networking device is implemented on the guest OS executing on the first hypervisor.

\* \* \* \* \*